US012483492B2

(12) United States Patent
Zheng et al.

(10) Patent No.: US 12,483,492 B2
(45) Date of Patent: Nov. 25, 2025

(54) EFFICIENT TOPOLOGY-AWARE TREE SEARCH ALGORITHM FOR A BROADCAST OPERATION

(71) Applicant: Intel Corporation, Santa Clara, CA (US)

(72) Inventors: Gengbin Zheng, Austin, TX (US); Maria Garzaran, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 17/702,652

(22) Filed: Mar. 23, 2022

(65) Prior Publication Data

US 2022/0217071 A1 Jul. 7, 2022

(51) Int. Cl.
*H04L 45/02* (2022.01)
*H04L 12/18* (2006.01)

(52) U.S. Cl.
CPC .............. *H04L 45/02* (2013.01); *H04L 12/18* (2013.01)

(58) Field of Classification Search
None
See application file for complete search history.

(56) References Cited

U.S. PATENT DOCUMENTS

2017/0111261 A1* 4/2017 Francois ............... H04L 45/125
2018/0183857 A1* 6/2018 Langer .................... H04L 67/01
2023/0228580 A1* 7/2023 Fruehling ............. G01C 21/30 701/410

OTHER PUBLICATIONS

Dorier, Mattieu et al, "Evaluation of Topology-Aware Broadcast Algorithms for Dragonfly Networks," University of California, Davis, Computer Science Department, Rensselaer Polytechnic Institute, May 13, 2016, 10 pages.

* cited by examiner

*Primary Examiner* — Saad Khawar
(74) *Attorney, Agent, or Firm* — Essential Patents Group, LLP; Christopher K. Gagne

(57) ABSTRACT

Methods and apparatus for efficient topology-aware tree search algorithm for a broadcast operation. A broadcast tree for a broadcast operation in a network having a hierarchical structure including nodes logically partitioned at group and switch levels. Lists of visited nodes (vnodes) and unvisited nodes (unodes) are initialized. Beginning at a root node, search iterations are performed in a progressive manner to build the tree, wherein a given search iteration finds a unode that can be reached earliest from a vnode, moves the unode that is found from the unode list to the vnode list and adds new unodes to the unode list based on the location of the unode. Beginning with the switch the root node is connected to, the algorithm progressively adds nodes from other switches in the root group and then from other groups and switches within those other groups and continues until all nodes have been visited.

21 Claims, 14 Drawing Sheets

```
List unvisited_nodes  // All except for the root
List visited_nodes      // Only the root
availableTime[root] = 0;

while (size(visited) !=N) {
  min = MAXINT;
  for all nodes u in unvisited {
    for all nodes v in visited {
      earliestReachableTime = availableTime[v] + distance[v][u] + 2*o
      if (earliestReachableTime < min) {
        min = earliestReachableTime;
        unode = u;
        vnode = v;
      }
    }
  }
  Assign unode as the child of vnode;
  Remove unode from the list of unvisited;
  Add unode to the list of visited;
  availableTime[vnode] +=o;
  availableTime[vnode] =min;
}
```

*Fig. 8*

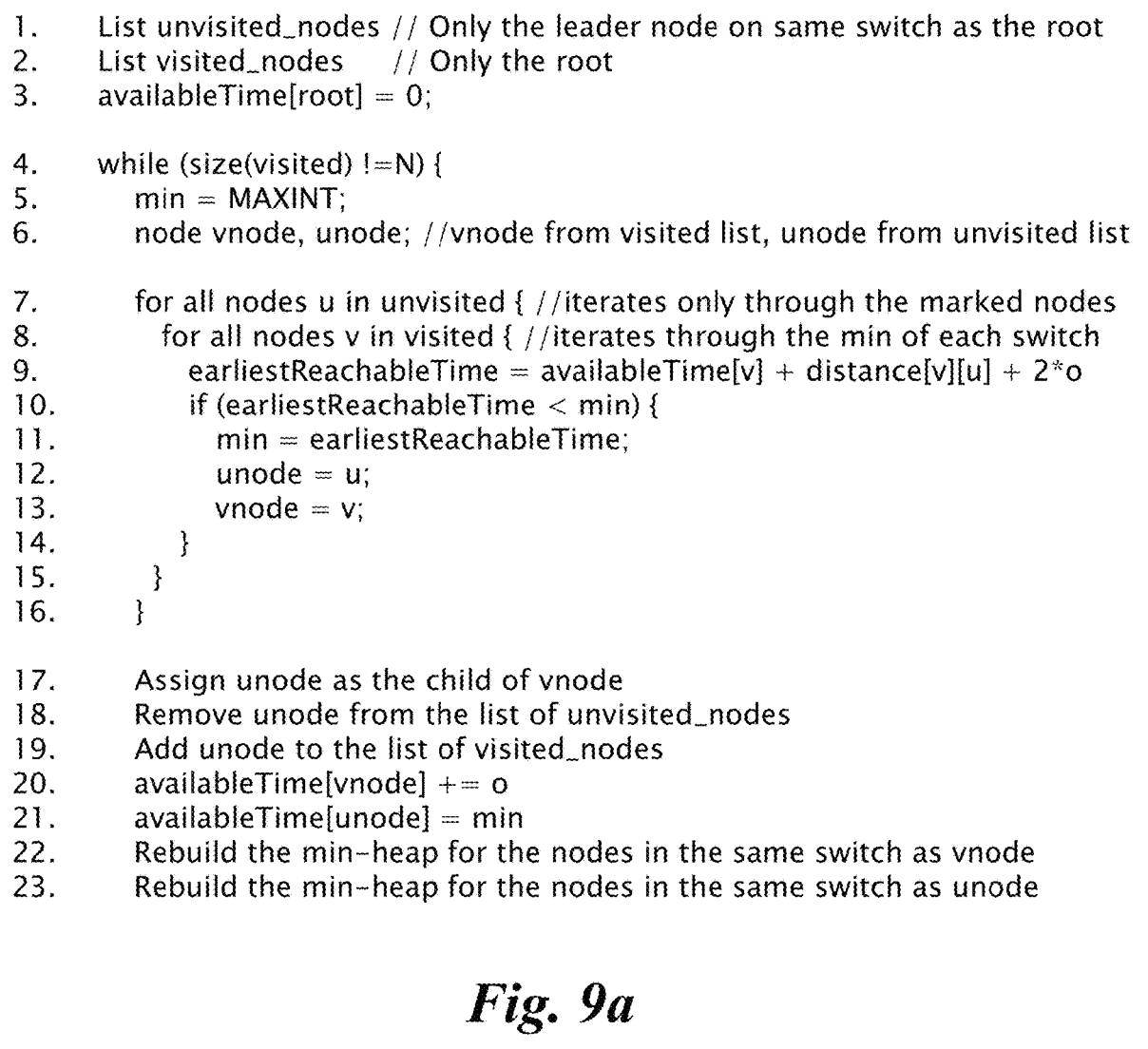

```
List unvisited_nodes // Only the leader node on same switch as the root
List visited_nodes     // Only the root
availableTime[root] = 0;

while (size(visited) !=N) {
   min = MAXINT;
   node vnode, unode; //vnode from visited list, unode from unvisited list

   for all nodes u in unvisited { //iterates only through the marked nodes
     for all nodes v in visited { //iterates through the min of each switch
       earliestReachableTime = availableTime[v] + distance[v][u] + 2*o
       if (earliestReachableTime < min) {
         min = earliestReachableTime;
         unode = u;
         vnode = v;
       }
     }
   }

   Assign unode as the child of vnode
   Remove unode from the list of unvisited_nodes
   Add unode to the list of visited_nodes
   availableTime[vnode] += o
   availableTime[unode] = min
   Rebuild the min-heap for the nodes in the same switch as vnode
   Rebuild the min-heap for the nodes in the same switch as unode
```

*Fig. 9a*

```
if unode is the leader_node for the switch {
  add all nodes from the switch to the unvisited_nodes list
  mark only one of these nodes to participate on the search
  If unode is not on the same switch as the root {
    mark another leader_node from a different switch on same group
  }
 } else if unvisited_nodes contains nodes from same switch as unode {
     mark one of the nodes from same switch as unode
 }

if unode is the leader_node of a group {
  mark a leader_node from a group different from the unode group
}

if unvisited-nodes list is empty {
  if there are unvisited leader_nodes from switches in group of unode {
    add all the leader_nodes from other switches in unode group
    mark only one of the leader_nodes to participate on the search
   } else if there are unvisited leader_nodes from other groups {
      add all the leader_nodes from all the switches in all the groups
      mark only one leader_node to participate on the search
   }
 }
} // end while loop
```

*Fig. 9b*

EFFICIENT TOPOLOGY-AWARE TREE SEARCH ALGORITHM FOR A BROADCAST OPERATION

GOVERNMENT RIGHTS

This invention was made with Government support under Agreement No. 8F-30005, awarded by DOE. The Government has certain rights in this invention.

BACKGROUND INFORMATION

Generally, a broadcast is implemented with a tree-based algorithm, where the branching factor of the tree determines how many nodes (or processes) a given node sends data to. In general, a tree-based algorithm is best for small messages as it has a time complexity of logkN*(latency+message_size/BW), where N is the number of nodes, k is the branching factor of the tree, latency is the network latency and other overheads needed to send a message, message size is the size of the message, and BW is the bandwidth of the fabric used to send the message.

For larger messages, an algorithm that uses a scatter followed by an allgather operation is more efficient, because the bandwidth component of this algorithm is more efficient than using a tree-based implementation. In general, for small/medium messages, most runtimes use either a k-ary or k-nomial tree. These are topology-unaware trees that do not take into account the network topology. The main difference between the k-ary and the k-nomial trees is that with a k-ary tree each parent node has exactly k-children nodes. However, with a k-nomial tree, at each step of the algorithm, a parent node sends a message to k-nodes, and each node continues sending a message to k-different nodes until all the nodes in the system have received the message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 is a pseudocode listing for a naïve algorithm employing a nearest neighbor heuristic;

FIGS. 9*a* and 9*b* comprise a pseudocode listing for an improved algorithm for building a broadcast tree according to one embodiment;

DETAILED DESCRIPTION

Figure 1:
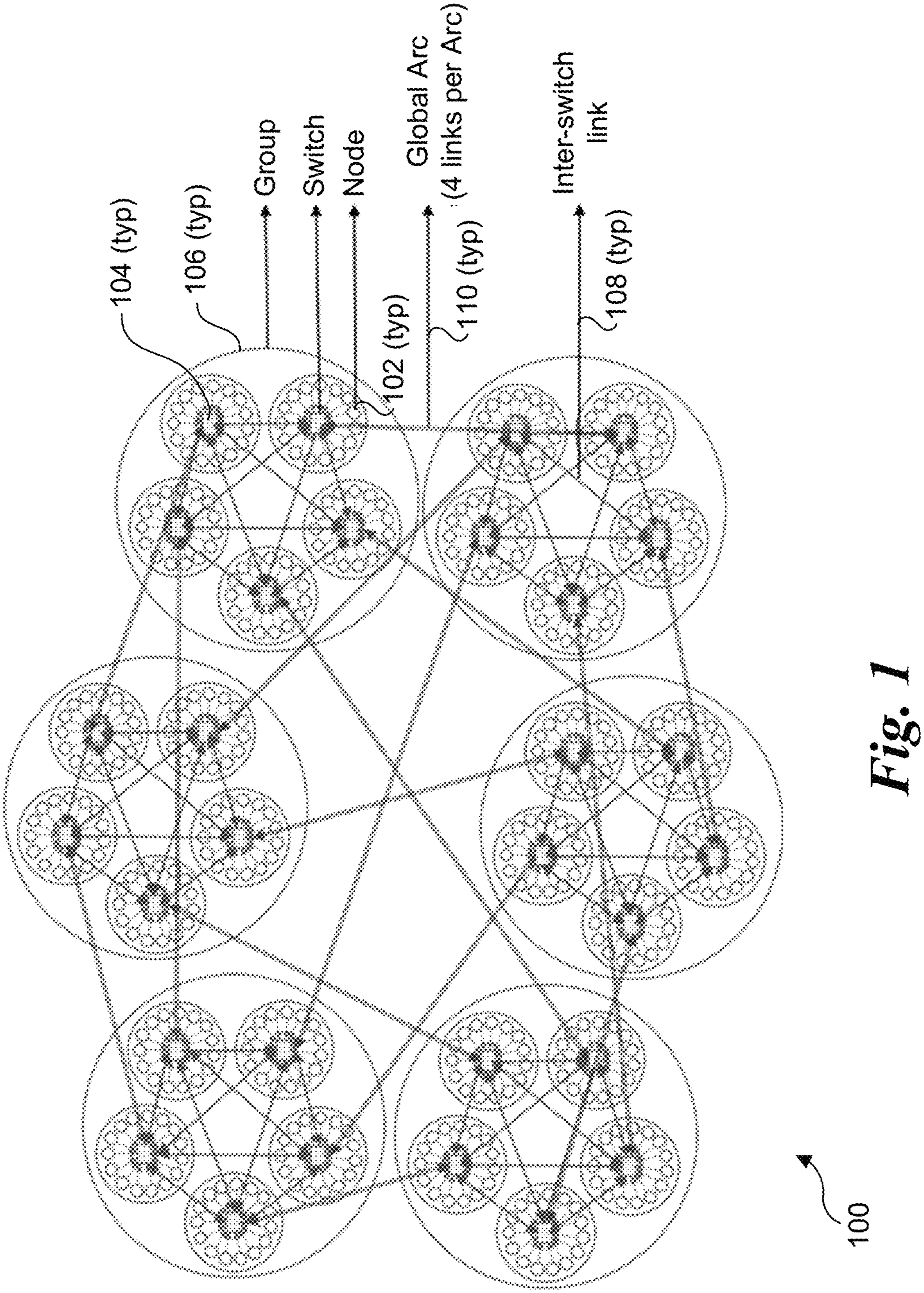
FIG. 1 is a diagram of a network having a three-tier dragonfly topology.

Embodiments of methods and apparatus for efficient topology-aware tree search algorithm for a broadcast operation are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

For illustrative purposes, example broadcast operations are discussed using a dragonfly network topology. First, a description of a dragonfly network topology is presented and then discuss common solutions and their disadvantages.

A dragonfly topology is a hierarchical network topology with the following characteristics: 1) Several groups are connected using all-to-all links, that is, each group has at least one direct link to the other group; 2) The topology inside each group can be any topology, with the butterfly network topology being common; and 3) The focus of the dragonfly network is the reduction of the diameter of the network.

An example of a three-tier dragonfly topology 100 is shown in FIG. 1. At the first level of the hierarchy are the compute nodes 102 (very small circles) connected to the same switch 104. At the second level of the hierarchy are the compute nodes inside the same group (large circles) 106. Every switch 104 in a group 106 has a direct link (inter-switch links 108) to every other switch in the same group so that two nodes in the same group are at most one hop apart. At the third level of the hierarchy are the nodes in different groups. In FIG. 1, every group 106 has a direct connection to every other group, but only one switch in the group has a direct link between each pair of groups. At each of these levels, there could be more than one link to provide higher bandwidth because multiple nodes could be communicating simultaneously across these links. As an example, in FIG. 1, the double-headed arrows connecting groups (global arcs 110) have multiple links (e.g., 4 links).

It is noted that three-tier dragonfly topology 100 is a simplified representation showing groups of nodes at the switch and group levels to be the same, and the size of the groups to be the same and length of links to be the same or similar. In practice, multi-tier dragonfly topologies will generally be somewhat asymmetric (and could be very asymmetric), and the lengths of links would differ. Moreover, in a large-scale implementation of thousands of nodes, the differences in link latencies might be an order of magnitude or more between the shortest links and the largest links. Additionally, a network topology may employ a hierarchical structure comprising N-tiers, where N is three or more.

Under conventional practice, a spanning tree is built to perform the broadcast operation. Conventional spanning tree algorithms build a hierarchical tree structure comprising an undirected graph with no cycles. Based on the spanning tree that is generated, each node knows the parent node from which it will receive messages and its children nodes to which it needs to send the messages. Algorithms using trees that do not take into account the network topology are generally easier to implement but usually take more time to broadcast a message to all nodes. The reason is that messages can go back and forth several times across groups and/or across switches in the same group. This results in significant performance loss.

As an example, assume that in the dragonfly network topology in FIG. 1 sending a message between two nodes in the same group takes 1000 nsec, where 200 nsec are due to the time to send the message, 600 nsec is due to the switch and wire latencies and 200 nsec are due to the time to receive the message. Similarly, sending a message across nodes in the same group but different switches takes 1300 ns, with 900 ns being the time due to the wire and switch latencies; sending a message between nodes in different groups takes 1900 ns, with 1500 ns being the time due to the wire and switch latencies. Assuming a node can only send one message at a time, a node can send a message every 200 ns.

Figure 2:
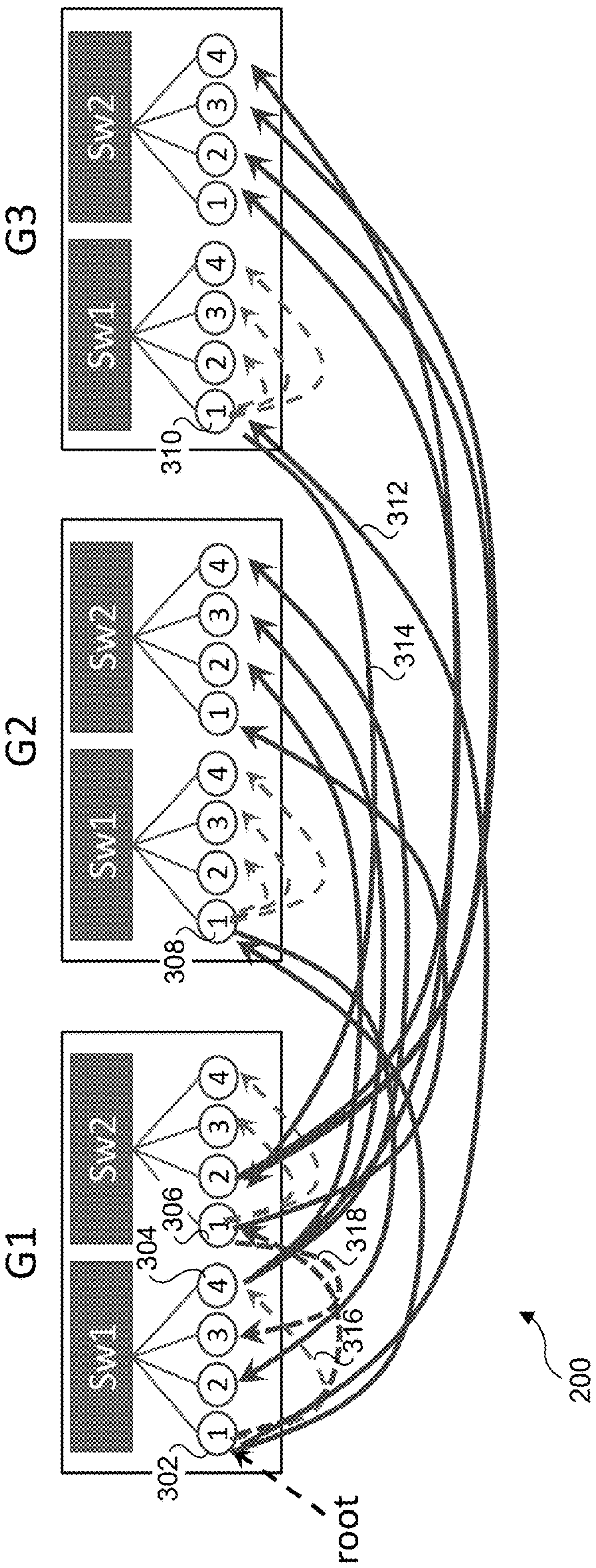
FIG. 2 is a diagram showing broadcast messages for the network of FIG. 1 using a topology-unaware 4-ary tree to perform a broadcast.
Figure 3:
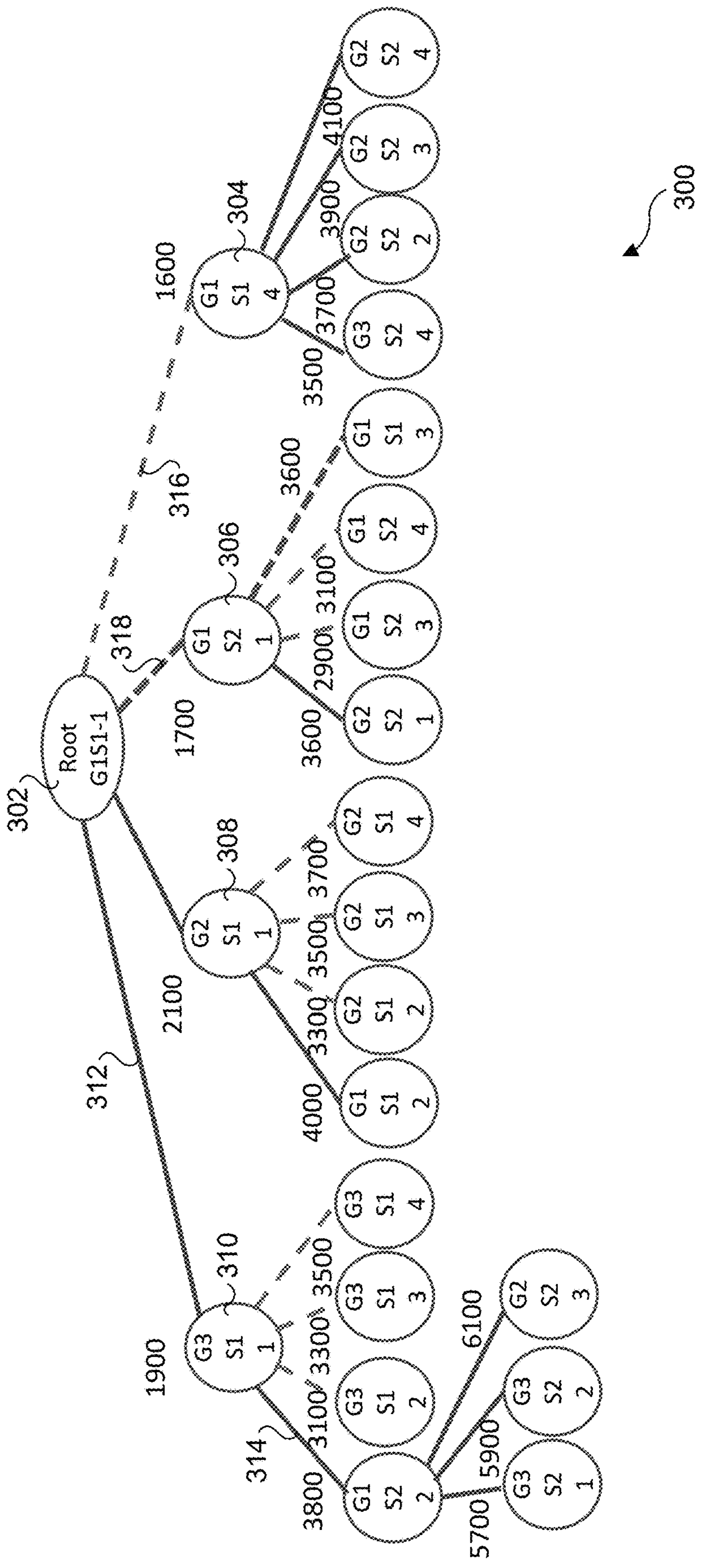
FIG. 3 is a diagram depicting the broadcast messages of FIG. 2 along with time information indicating when the messages are received.

FIGS. 2 and 3 shows a small three-tier dragonfly network topology 200 using a topology unaware 4-ary tree 300 to perform a broadcast. Dragonfly network topology 200 includes three groups (G1, G2, and G3) with two switches (Sw1 and Sw2) per group. As shown in FIG. 3, topology unaware 4-ary tree 300 includes a root 302 comprising node 1 of switch 1 of group 1, depicted using nomenclature "G1S1-1". The remaining nodes are identified by circles labeled by group#: switch#: node#. For example, node 304 is labeled G1 S1 4, node 306 is labeled G1 S2 1, node 308 is labeled G2 S1 1, and node 310 is labeled G3 S1 1. The numbers on the tree branches (referred to as arcs) of tree 300 show the time when the message is available in the corresponding node in nanoseconds (relative to a start time of 0). In the Figures herein, arcs shown as solid lines (e.g., arcs 312 and 314) are between nodes in different groups, while arcs shown in large dashed lines (e.g. arc 316) are between nodes coupled to the same switch and arcs shown in small dashed lines (e.g., arc 318) are between nodes in the same group but attached to different switches. Each arc in FIG. 2 is associated with a respective arc in FIG. 3 that is implemented using corresponding link path segments, where each link path segment is implemented using a link connected between a pair of switches. Larger networks may employ one or more additional switching tiers that are used link nodes in separate racks.

As shown in the left part of tree 300 in FIG. 3, the message goes from group G1 to group G3 via an arc 312 and then back to group G1 via an arc 314. Additionally, a given node cannot forward the message to other nodes coupled to its switch until the message is received. This results in an inefficient path and longer running time for the broadcast operation.

Figure 4:
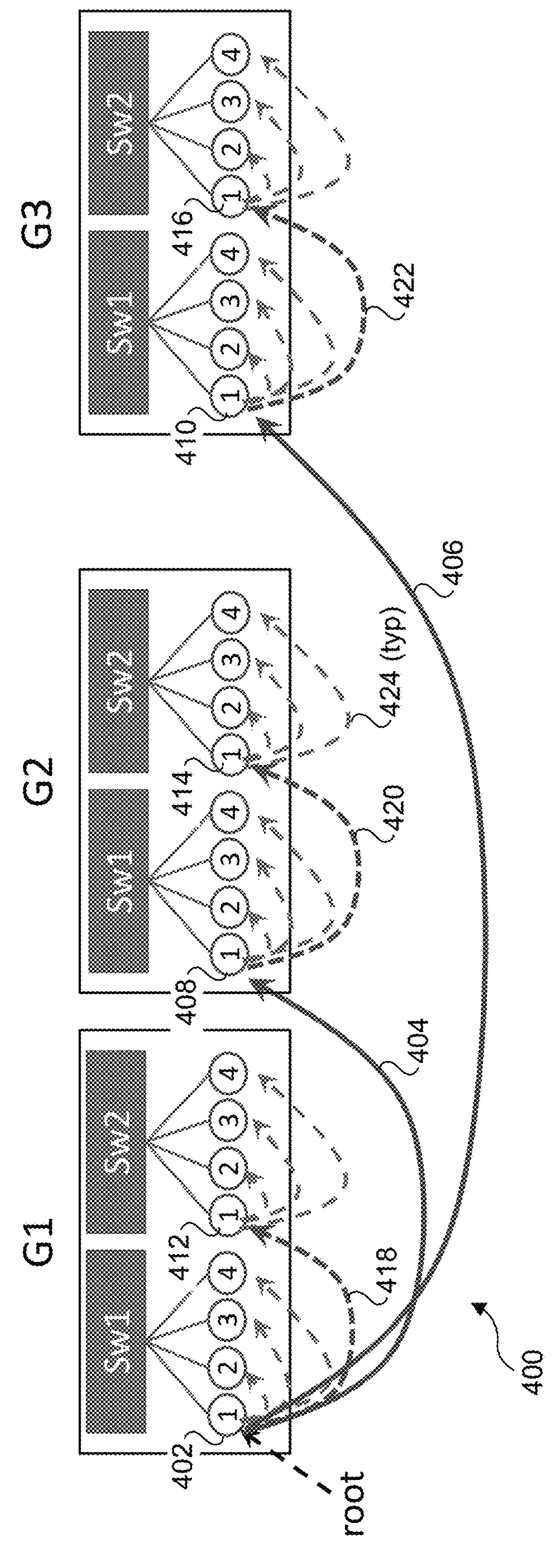
FIG. 4 is a diagram showing broadcast messages for the network of FIG. 1 using an example of a topology-aware tree to perform a broadcast.

A more efficient and simple heuristic uses a hierarchical topology-aware tree that sends the message to the furthest away node first, so that nodes in the critical path (the furthest away from the root) can receive the message earliest. In this hierarchical design, each switch has a designated node leader (switch leader) and each group has a designated node leader (group leader). In practice, each node also has a leader rank, but for the discussion here we assume a single rank per node and we refer to it as node leader. The broadcast is performed in three steps, as shown in FIG. 4, which depicts a three-tier dragonfly network topology 400 including three groups G1, G2, G3. As shown by arcs 404 and 406, the root node 402 first broadcasts the message to the group leader nodes 408 and 410, thus making one copy of the message available in every group. Then, the group leader nodes 408 and 410 broadcast the message to the switch leaders 412, 414, and 416 within their respective groups, as shown by arcs 418, 420, and 422. Then, the switch leaders 402, 408, 410, 412, 414, and 416 broadcast the message to all the other nodes in their switch, as depicted by long dash arrows 424.

Figure 5:
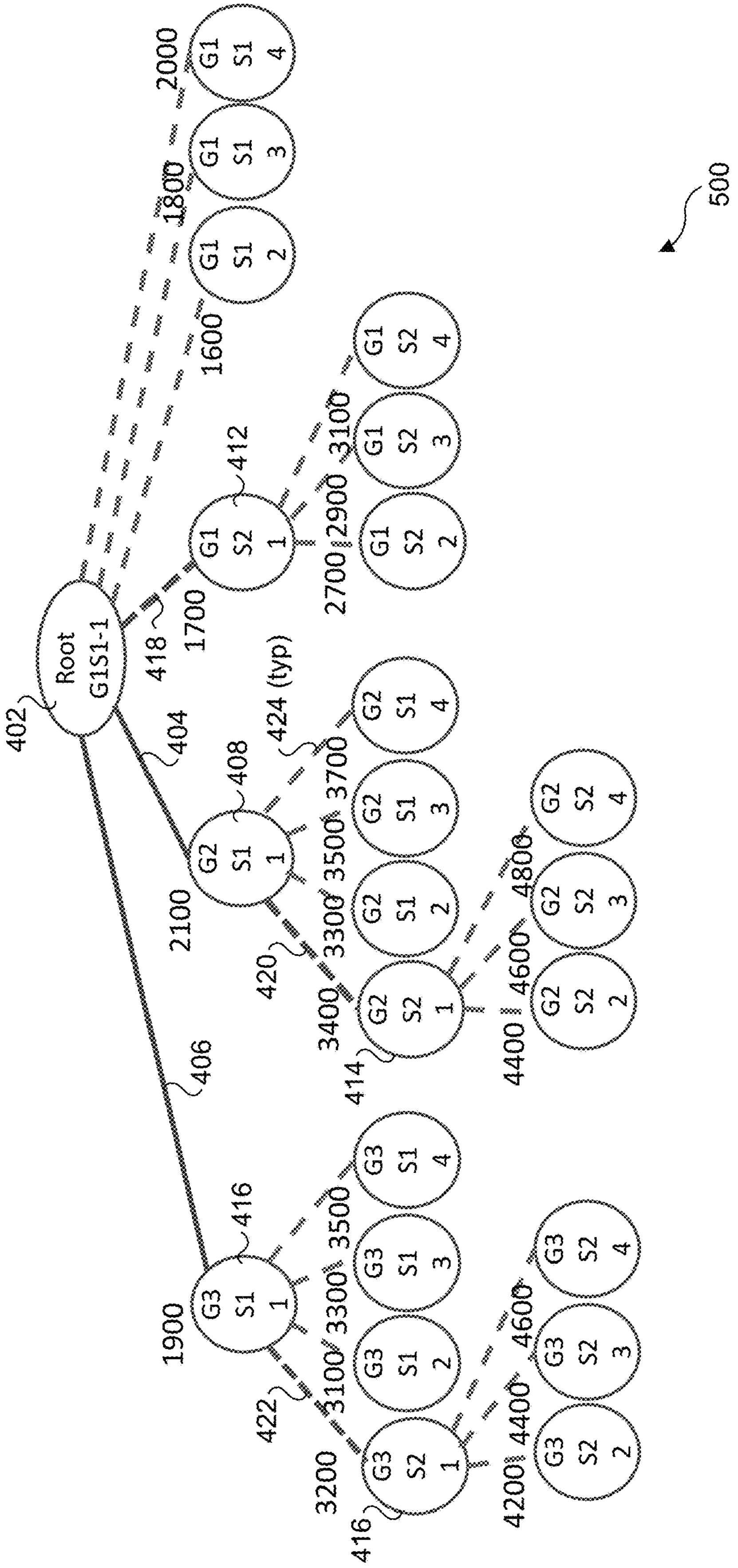
FIG. 5 is a diagram depicting the broadcast messages of FIG. 4 along with time information indicating when the messages are received.

A corresponding tree 500 with the time when the message is available on each node is shown in FIG. 5. As the figure shows, with this hierarchical tree the broadcast ends at time 4800 versus time 6100 of the topology unaware tree in FIG. 3.

The benefits of this hierarchical approach in FIG. 5 include: 1) data is sent first to the nodes that are farther apart. The reason to do that is to decrease the likelihood that these far apart nodes appear on the critical path on the execution of the broadcast; 2) locality, since the messages follow the hierarchy of the network topology, only one message is sent across the critical paths in the topology, avoiding messages crossing back and forth between a pair of groups, for instance; and 3) tree generation is simple. While the implementation requires some topology discovery API, identifying the leader node at each level of the hierarchy is straight forward (for instance, the node with the lowest identifier (e.g., node ID) on the switch could be the switch leader). Then, each node can independently build the tree and find its parent and children nodes.

While this hierarchical approach is better than a topology unaware tree, sending the data first to the nodes that are farther apart, delays the time when the first nodes receive the messages. Empirical and analytical results show that the heuristic used for the algorithm disclosed below performs better than this hierarchical approach.

Under one aspect, embodiments of the solution build a tree where each node sends the message first to the nodes that can be reached earlier. The rationale for this approach is that the earliest a node receives the message, the earlier it can broadcast the message to other nodes, increasing the number of nodes that are broadcasting the message and therefore decreasing the overall time to perform the broadcast operation.

Figure 6:
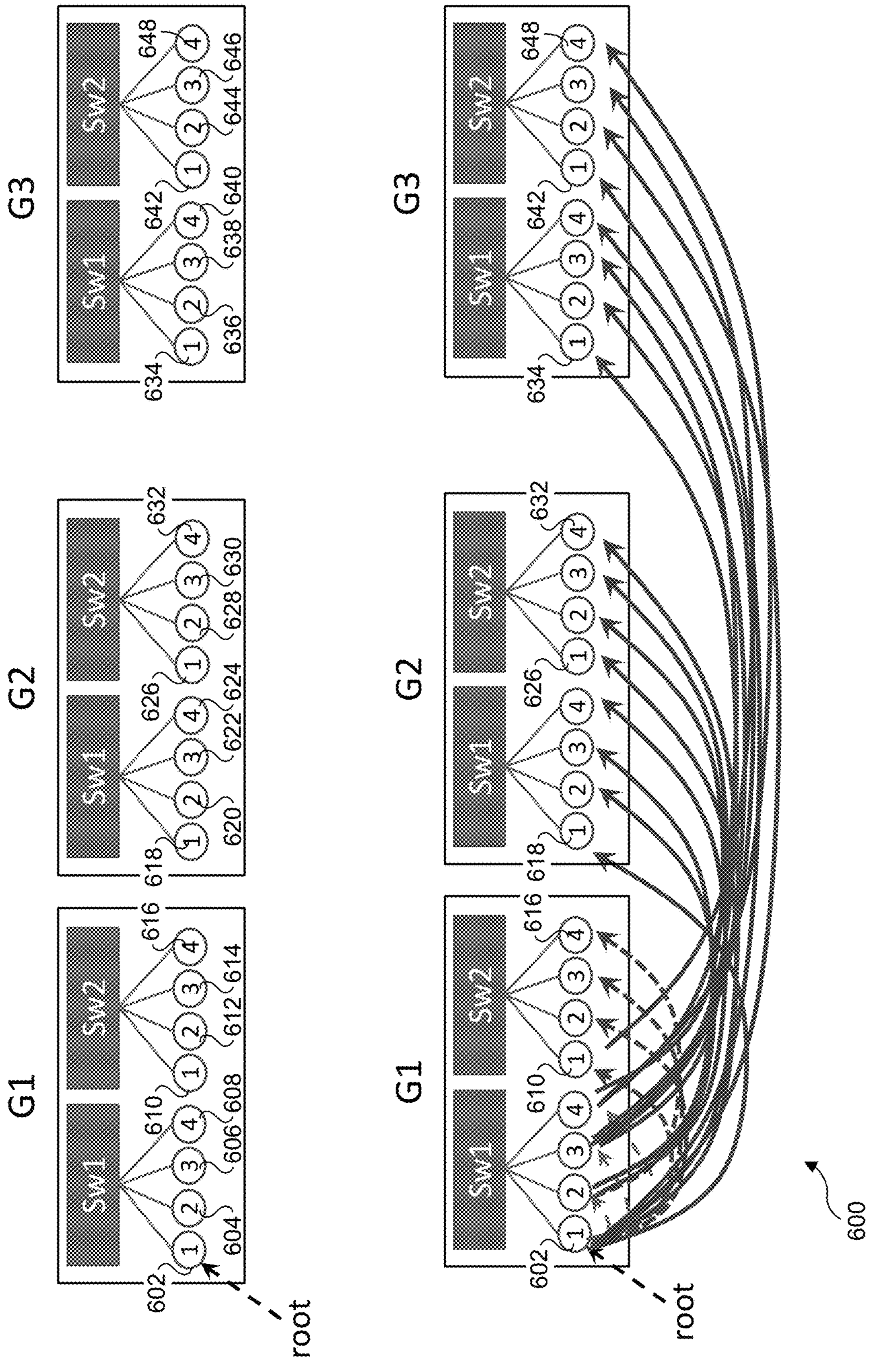
FIG. 6 is a diagram showing broadcast messages for the network of FIG. 1 using and embodiment of the improved topology-aware tree algorithm disclosed herein.
Figure 7:
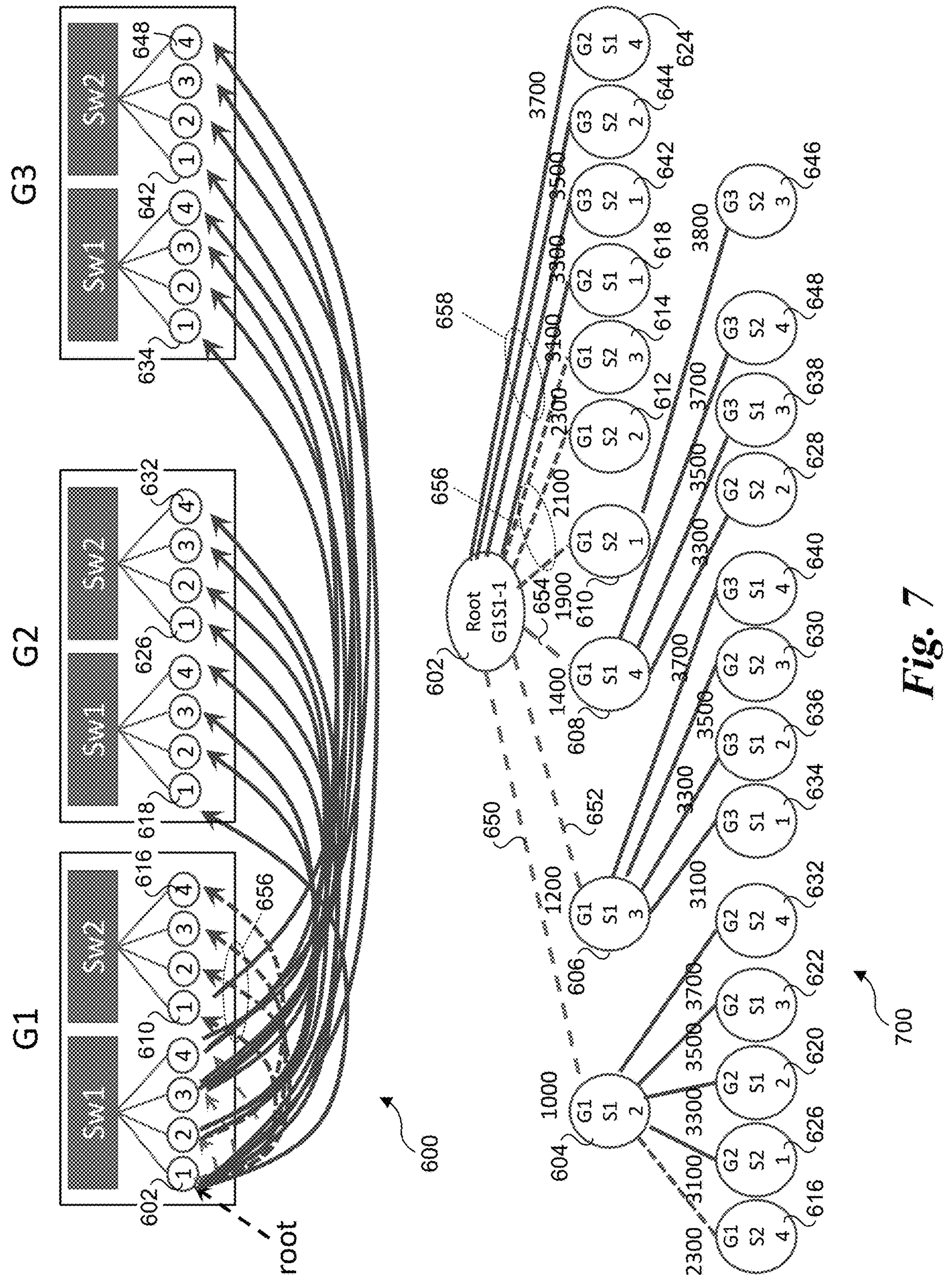
FIG. 7 is a diagram depicting the broadcast messages of FIG. 6 along with time information indicating when the messages are received.

A pictorial view of the dragonfly network topology 600 and tree 700 using this heuristic are shown in FIG. 6 and FIG. 7, respectively. As shown in the upper portions of FIGS. 6 and 7, group G1 of dragonfly network topology 600 includes nodes 602, 604, 606, 608, 610, 612, 614, and 616, group G2 includes nodes 618, 620, 622, 624, 626, 628, 630, and 632, and group G3 include nodes 634, 636, 638, 640, 642, 644, 646, and 648. As shown in the lower portion of FIG. 7, the root node 602 first sends three copies of the message to its nearest nodes—nodes 604, 606, and 608, as depicted by arcs 650, 652, and 654. Next, root node 602 sends three copies of the message to nodes 610, 612, and 614, as depicted by arcs 656. This is followed by root node 602 sending copies of the message to nodes 618, 642, 644, and 624, as depicted by arcs 658.

Moving to the next level in tree 700, node 604 sends copies of the message to nodes 616, 626, 620, 622, and 632. Node 606 sends copies of the message to nodes 634, 636, 630, and 640. Node 608 sends copies of the message to nodes 628, 638, and 648, while node 610 sends a copy of the message to node 646.

As tree 700 in FIG. 7 shows, with this heuristic the broadcast ends at time 3800 versus time 4800 for tree 500 in FIG. 5 and time 6100 for tree 300 in FIG. 3. Experimental results also show that this heuristic performs the broadcast faster.

A drawback of the heuristic that sends to the nearest neighbors first is the time it takes to generate the tree. It is noted for all the trees illustrated herein, consideration of both the tree structure and branch order are important. Generally, identification of nodes in the different levels in a tree (what nodes should be at what levels) is moderately complex. However, considering a combination involving the tree structure and branch order (or other message transmission order) adds another level of complexity.

A goal of the embodiments is to minimize the broadcast time, that is, the time it takes for a root node to send the data to all the nodes in a supercomputer system. To this end, an algorithm is disclosed to efficiently compute the tree to perform the broadcast based on the heuristic that the broadcast time can be minimized by sending the message first to the nearest neighbor(s), that is, the node(s) that can receive the message the earliest. The rationale behind this heuristic is that when a node receives a message it becomes a broadcaster itself, so by sending the data first to the nodes that can receive the data earlier, the number of broadcasters increase, and since more nodes are sending the data, the time to complete the broadcast reduces.

In the embodiments described and illustrated herein, the solution is applied to a network with a dragonfly network topology; however, this is merely exemplary and non-limiting, as the teachings and principles described and illustrated herein may be applied to any network where it is possible to identify the latency needed for a message to go from a node A to a node B, and which includes the time due to the processing time of each of the switches in the path from A to B plus the time to process the message in the sender and in the receiver nodes. Generally, the approach assumes that there are a set or cluster of nodes that are at the same latency (or distance). Notice that while usually multiple paths exist between two given nodes in a supercomputer system, small messages usually follow along the same path (especially since standards such as MPI (Message Passing Interface) impose ordering requirements).

As previously explained, the algorithm to execute a broadcast needs to compute a tree so that each node knows its parent node (node from which it will receive the message) and its child or children nodes (nodes to which a given node will send the message). One challenge is that the tree generation for the heuristic that sends first to the nearest neighbor has a time complexity on the order of $N^3$, where N is the number of nodes in the system. As the number of nodes available for distributed processing on today's supercomputers can be quite large, e.g., >20,000, the time to generate the tree itself could make use of conventional heuristics nonviable in practice.

Naïve Algorithm for Nearest Neighbor Heuristic

To better under and appreciate the advantages provided by the novel tree generation algorithm discussed herein, a discussion of a naïve algorithm employing a nearest neighbor heuristic, as illustrated in FIG. 8, is first provided. As shown in lines 1 and 2, the naive algorithm contains two lists: A list of unvisited_nodes, nodes that have not received the message yet, and a list of visited_nodes, nodes that have already received the message. Initially, only the root is on the list of visited nodes. As shown in line 3, there is an array availableTime that contains for each node in the visited list the next time the node is available to start sending a message. The algorithm assumes that a node sending a message needs o units of time due to the overhead to execute the instructions to send the message. Similarly, the node that receives the message needs o units of time to execute the instructions to receive the message. The assumption is that a node can only send or receive one message at a time. The time it takes for node X to send a message to node Y is computed as o+distance [X][Y]+o, where distance[X][Y] is the time it takes for the message to flow from node X to node Y and that takes into account the latency, time due to message size and network bandwidth, and delay incurred in each of the switches in the path between nodes X and Y. The assumption is that this time is known and is usually determined based on the location of the two nodes in the network topology, assuming a fixed path, which usually is the minimal path.

The outer while loop (line 4) of the algorithm iterates until the list visited_nodes contains all the nodes in the system, a total of N iterations, where N is the number of nodes. On each iteration of this outer while loop, the algorithm finds the unvisited node u (unode) that can be reached the earliest in time from any of the already visited nodes v. The algorithm computes the node in the visited_nodes list (vnode) that is used to reach the unode, updates the available Time of both nodes, removes vnode from the unvisited_nodes list and adds it to the visited_nodes list.

Improved Tree Building Algorithm

Figure 10:
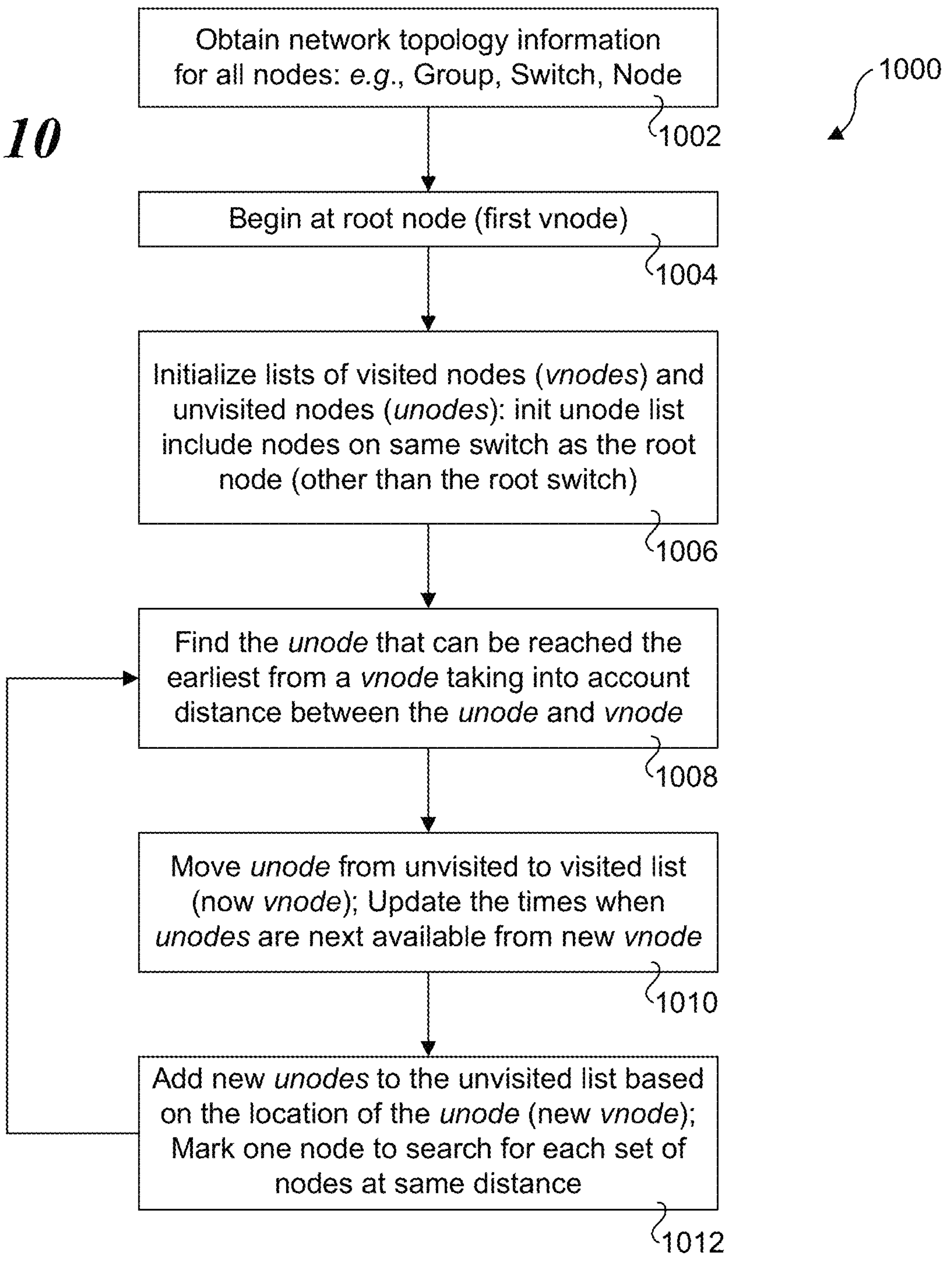
FIG. 10 is a flowchart illustrating operations and logic performed by the improved algorithm, according to one embodiment.
Figure 11:
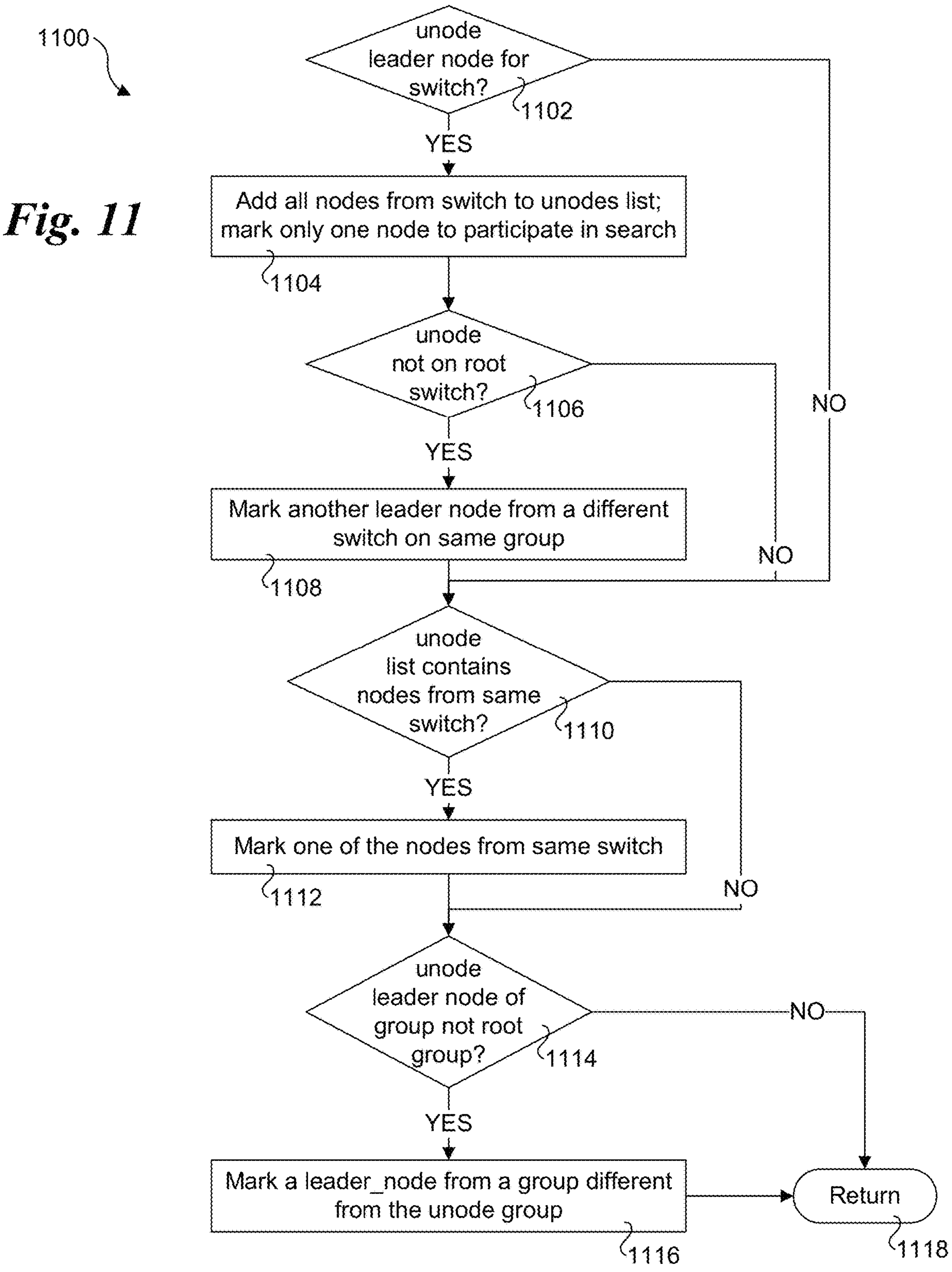
FIG. 11 is a flowchart illustrating operations and logic performed by the improved algorithm to add new nodes to the unlisted node list, according to one embodiment.
Figure 12:
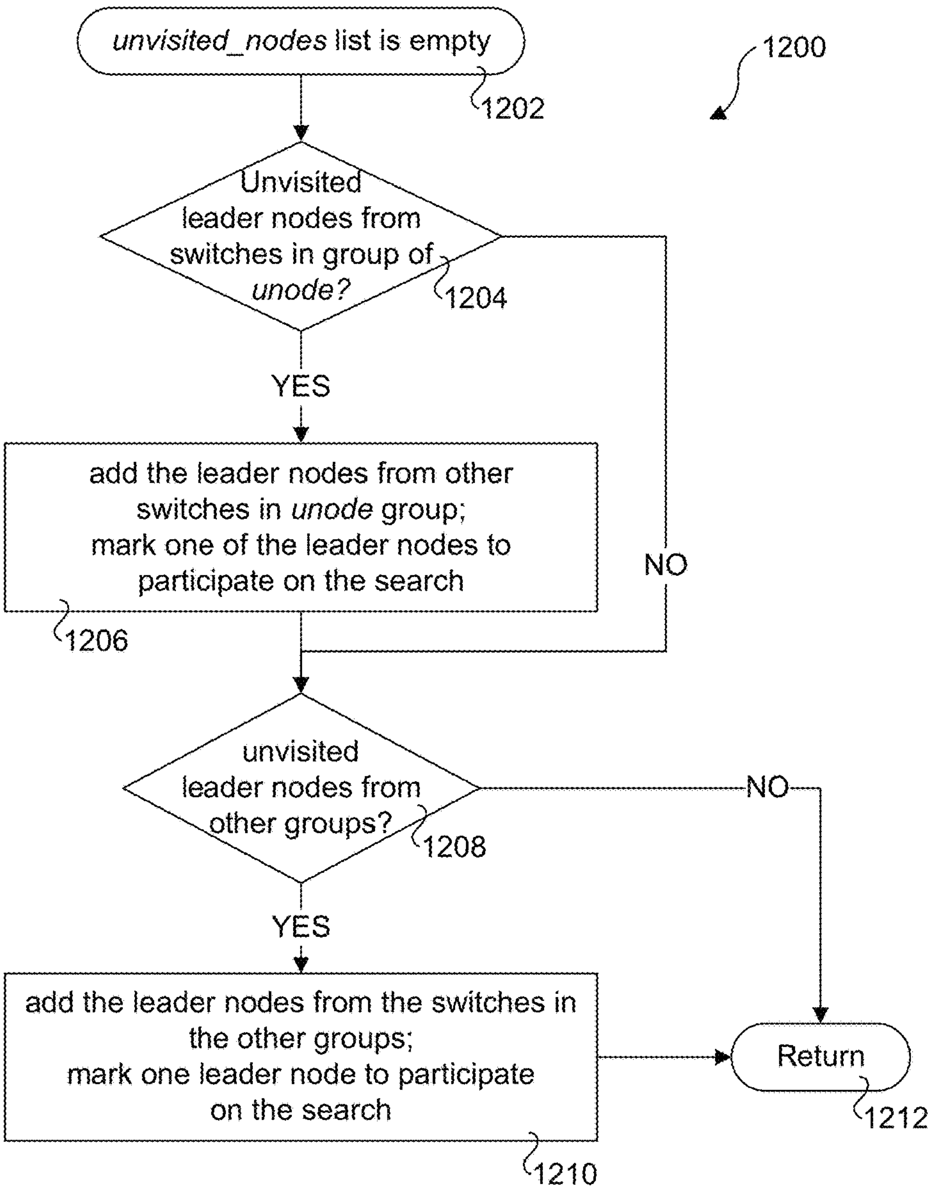
FIG. 12 is a flowchart illustrating operations and logic performed by the improved algorithm when the unvisited node list is empty, according to one embodiment.

The algorithm illustrated (via pseudocode) in FIGS. 9*a* and 9*b* and flowcharts in FIGS. 10, 11, and 12 improves over the naive algorithm. It takes into account the fact that for a three-tier dragonfly network topology, there are only three possible distances between any two nodes in the system. The algorithm assumes that a node knows the switch-id of the switch to which it is connected and the group-id of the group it belongs to (supercomputer systems usually have APIs to query this information).

Given a three-tier dragonfly network topology (such as shown in FIG. 1 and discussed above), the three possible distances are: distance 1 is the distance between all the nodes connected to the same switch; distance 2 is the distance between nodes in the same group but on a different switch; and distance 3 is the distance between nodes in different groups. Notice that on a dragonfly network topology a node could reach a target group faster if the node is connected to a switch that has a direct link with that target group. The algorithm does not take this into account because it requires information about how switches are connected, which it is not assumed to be known. Similarly, the algorithm can easily be extended to a higher tier network topology or to other network topologies.

The improved tree building algorithm applies the following three optimizations to optimize the naive algorithm:

1) If a node v in the visited_nodes list has the same distance to multiple nodes u in the unvisited_nodes list, the algorithm only needs to compute the distance to one of those nodes in the unvisited_nodes list. For instance, assume node 1 in the visited_nodes list is connected to the same switch and group as nodes 2 through 64 on the unvisited_nodes list. Since the distance to all of them is the same, we only need to compute the distance to one of them. The same principle applies for nodes in different switches and same group or nodes in different groups. This optimization is achieved by only marking certain nodes when adding multiple nodes in the univisited_nodes list, so that the loop in line 7 only iterates through the marked nodes (lines 26, 39, and 42). Notice that the algorithm marks nodes (lines 28, 31, and 34) as one of the nodes from the unvisited_nodes list moves to visited_nodes list.
2) Since the goal is to send the message first to the nodes that can be reached the earliest in time, the unvisited_nodes list should initially contain only nodes in the same switch as the root node. Once all the nodes in the same switch have been added to the visited_nodes list, nodes from the other switches in the same group can be added to the unvisited_nodes list. Similarly, once all the nodes in the same switch are in the visited_nodes list, nodes from other groups can be added to the unvisited_nodes list. This optimization is applied by initializing the univisited_nodes list only with the leader node on the same switch as the root node. Nodes from other switches are added to the univisited_nodes list progressively. Nodes from the same switch as the leader node are added in line 25; nodes from different switch, but same group are added in line 31; nodes from all switches in different groups are added in line 34.
3) If multiple nodes from the same switch are in the visited_nodes list, the algorithm only needs to iterate through one node per switch, the node with the minimum availableTime among those nodes connected to the same switch. This is because each iteration of the outer while loop finds the node in the unvisited_nodes list that can be reached the earliest from a single node in the visited_nodes list.

This is accomplished by maintaining a min-heap data structure for all the nodes connected to the same switch that are part of the visited-node list. The visited_nodes list is organized as a list of min-heaps so that the loop in line 8 only iterates through the min from each min-heap. The min-heaps are re-built in lines 22 and 23.

FIG. 10 shows a flowchart 1000 illustrating operations used to build a broadcast tree using the improved algorithm. In a block 1002, the network topology information for all nodes is obtained. This includes identifying node members at the group and switch levels. Generally, the topology can be obtained using known methods that are outside the scope of this disclosure. In some cases, the topology will be specified by an entity that will be employing distributed processing using the broadcast tree that will be built; in this case, the topology may be specified in a file or data structure that already exists.

As shown in a block 1004, the process begins at the root node, which is also the first vnode. In a block 1006 the visited_nodes list (vnode list) and unvisited_node list (unode list) is initialized. The vnode list will contain the root node, and the unode list will initially include nodes attached to the same switch as the root (also referred to as the root switch) other than the root node.

The operations shown in blocks 1008, 1010, and 1012 are performed iteratively in a loop until all nodes have been moved to the visited list. In block 1008 a search is performed to find the unode that can be reached earliest from a vnode taking into account the distance between the unode and vnode. The search will calculate an overall latency (overall time it takes to send a message) for the paths traversed by a message that is sent from the vnode to the unodes being considered. As discussed above, the time it takes for node X to send a message to node Y is computed as o+distance[X][Y]+o, where distance[X][Y] is the time it takes for the message to flow from node X to node Y and that takes into account the latency, time due to message size and network bandwidth, and delay incurred in each of the switches in the path between nodes X and Y, and o is a predetermined time it takes to send out and receive a message at the sender and recipient.

For vnodes other than the root node, the overall latency that is calculated is added to the time when the message is received by the vnode (referred to as the available time in the following formula from line 9 in FIG. 9*a*):

$$earliestReachableTime = availableTime[v] + \text{distance}[v][u] + 2 * o$$

where v is the vnode and u is the unode.

Once the unode is found in block 1008, it is moved from the unvisited_node list to the visited_node list. The times when the unodes are next available from the new vnode are also updated and the min-heaps are rebuilt accordingly in lines 22 and 23.

In block 1012, new unodes are added to the unvisited_node list based on the location of the unode that has been found (the new vnode). In addition, a single node is marked to search for each set of new nodes that have been added to the unvisited_node list having the same distance (e.g., coupled to the same switch or within the same group). The logic than loops back to block 1008 to perform the next search iteration.

Further details of the operations performed when adding unodes to the unvisited_node list in block 1012 are shown in flowcharts 1100 and 1200 of FIGS. 11 and 12. With reference to flowchart 1100, in a decision block 1102 a determination is made to whether the unode is a leader node for a switch. If it is (answer is YES), all nodes from the switch are added to the unvisited_node list, while only one of those nodes is marked to participate in the search.

In a decision block 1106, a determination is made to whether the unode is not on the root switch. If the answer is YES, the logic proceeds to a block 1108 in which another leader node from a different switch in the same group is marked.

Next, in a decision block 1110 a determination is made to whether the unvisited_nodes list contains nodes from the same switch as the unode. If the answer is YES, the logic proceeds to a block 1112 in which one of the nodes from the same switch is marked.

The logic then proceeds to a decision block 1114 in which a determination is made to whether the unode is a leader node of a group other than the root group. If the answer is YES, the logic proceeds to a block 1116 in which a leader_node from a group different from the unode group is marked. The flow then returns in a return block 1118. If the answer to decision block 1102 is NO, the logic flows to decision block 1110. As shown by the other NO branches, whenever the determination of decision blocks 1106, 1110, and 1114 is NO, the immediately following blocks are skipped.

Flowchart 1200 in FIG. 12 shows operations and logic performed when the unvisited_nodes list is empty, as shown in a start block 1202. In a decision block 1204 a determination is made to whether there are any unvisited leader nodes from switches in the group of the unode. If the answer is YES, the logic proceeds to a block 1206 in which all the leader nodes from other switches in the unode group are added. One of these added switch leader nodes is then marked to participate on the search.

Next, in a decision block 1208 a determination is made to whether there are any unvisited leader nodes from other groups. If the answer is YES, the logic proceeds to a block 1210 in which the leader nodes from the switches in the other groups (with unvisited leader nodes) are added. One of the switch leader nodes that is added is the marked to participate on the search. The flow then returns, as depicted by a return block 1212.

Implementation Environments

Generally, the algorithms disclosed herein may be implemented on a single compute node, such as a server, or in on multiple compute nodes in a distributed manner. Such compute nodes may be implemented via platforms having various types of form factors, such as server blades, server modules, 1U, 2U and 4U servers, servers installed in "sleds" and "trays," etc. In addition to servers, the algorithms may be implemented on an Infrastructure Processing Unit (IPU), and Data Processing Unit (DPU), or a SmartNIC).

Figure 13:
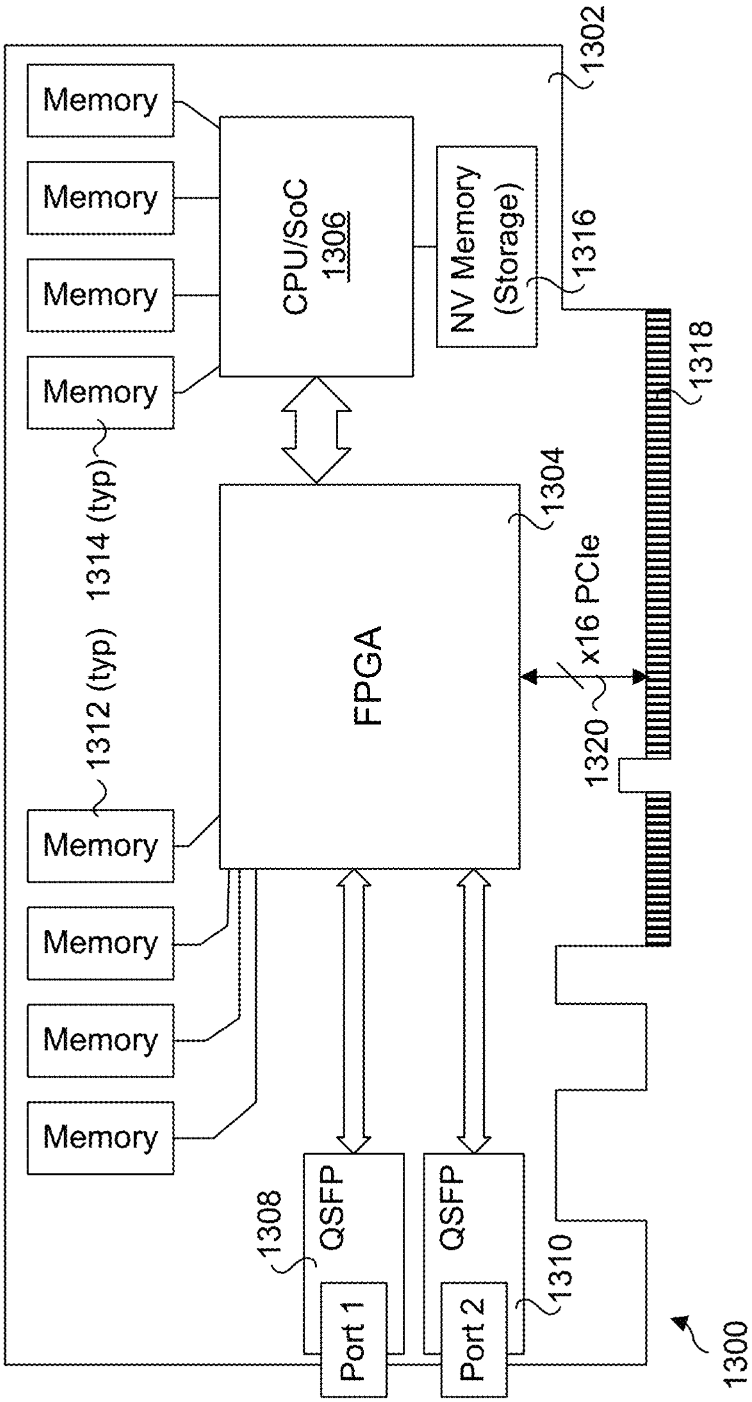
FIG. 13 is a diagram of an exemplary IPU card, according to one embodiment.

FIG. 13 shows one embodiment of IPU 1300 comprising a PCIe (Peripheral Component Interconnect Express) card including a circuit board 1302 having a PCIe edge connector to which various integrated circuit (IC) chips are mounted. The IC chips include an FPGA 1304, a CPU/SOC 1306, a pair of QSFP (Quad Small Form factor Pluggable) modules 1308 and 1310, memory (e.g., DDR4 or DDR5 DRAM) chips 1312 and 1314, and non-volatile memory 1316 used for local persistent storage. FPGA 1304 includes a PCIe interface (not shown) connected to a PCIe edge connector 1318 via a PCIe interconnect 1320 which in this example is 16 lanes. The various functions and logic in the embodiments of algorithms described and illustrated herein may be implemented by programmed logic in FPGA 1304 and/or execution of software on CPU/SOC 1306. FPGA 1304 may include logic that is pre-programmed (e.g., by a manufacturing) and/or logic that is programmed in the field (e.g., using FPGA bitstreams and the like). For example, logic in FPGA 1304 may be programmed by a host CPU for a platform in which IPU 1300 is installed. IPU 1300 may also include other interfaces (not shown) that may be used to program logic in FPGA 1304. In place of QSFP modules 1308, wired network modules may be provided, such as wired Ethernet modules (not shown).

CPU/SOC 1306 employs a System on a Chip including multiple processor cores. Various CPU/processor architectures may be used, including but not limited to x86, ARM®, and RISC architectures. In one non-limiting example, CPU/SOC 1306 comprises an Intel® Xeon®-D processor. Software executed on the processor cores may be loaded into memory 1314, either from a storage device (not shown), for a host, or received over a network coupled to QSFP module 1308 or QSFP module 1310.

Generally, and IPU and a DPU are similar, whereas the term IPU is used by some vendors and DPU is used by others. A SmartNIC is similar to an IPU/DPU except in will generally by less powerful (in terms of CPU/SoC and size of the FPGA). As with IPU/DPU cards, the various functions and logic in the embodiments of algorithms described and illustrated herein may be implemented by programmed logic in an FPGA on the SmartNIC and/or execution of software on CPU or processor on the SmartNIC.

Complexity of the Algorithm

As discussed above, the naive algorithm has a time complexity of $O(N^3)$ (the order of N cubed), where N is the number of nodes in the system. In comparison, the improved algorithm disclosed herein reduces the complexity significantly. The outer loop is still bounded by the number of nodes, N. However, the worst case for both the middle and the inner loops is bounded by the number of switches in the system (instead of number of nodes), that is the complexity of the disclosed algorithm is O(N*S*S), where S is the number of switches in the system. Given that switches generally have between 64 and 128 ports, S is significantly smaller than N.

We have implemented the naive and the improved algorithm and have measured the time to generate the tree, as shown in the tables below. TABLE 1 shows the running times in seconds for the tree search of the naïve algorithm, while TABLE 2 shows the running times in seconds for the improved algorithm disclosed herein. With the naive algorithm, we had to abort the tree search generation for a system with 10,000 nodes, because after 1793 seconds, the search had not completed. However, with the improved algorithm, we were able to generate the tree for 10,000 nodes in 0.1357144 seconds and we were even able to run the search for 1,000,000 nodes in a little bit over 10 seconds. Thus, with our disclosed algorithm, the broadcast with a nearest neighbor heuristic becomes practical.

TABLE 1

| # nodes | 10 | 50 | 100 | 1,000 | 10,000 |
|---|---|---|---|---|---|
| Exec 1 | 0.000010 | 0.000382 | 0.003623 | 1.798932 | Did not |
| Exec 2 | 0.000010 | 0.000558 | 0.003757 | 1.717787 | complete |
| Exec 3 | 0.000012 | 0.000576 | 0.004229 | 1.687969 | after |
| Exec 4 | 0.000011 | 0.000582 | 0.003099 | 1.703543 | 1793 |
| Exec 5 | 0.000012 | 0.000576 | 0.002882 | 1.856319 | seconds |
| Average | 0.000011 | 0.0005348 | 0.003518 | 1.752910 | |

TABLE 2

| # nodes | 50 | 100 | 1,000 | 10,000 | 100,000 | 1,000,000 |
|---|---|---|---|---|---|---|
| Exec 1 | 0.000079 | 0.000207 | 0.018072 | 0.153012 | 1.331204 | 10.24564 |
| Exec 2 | 0.000098 | 0.000247 | 0.017151 | 0.132121 | 1.478661 | 10.267156 |
| Exec 3 | 0.000097 | 0.000265 | 0.01649 | 0.1262 | 1.344881 | 11.98123 |
| Exec 4 | 0.000152 | 0.000215 | 0.017705 | 0.145202 | 1.467812 | 10.331204 |
| Exec 5 | 0.000077 | 0.0002 | 0.017025 | 0.122037 | 1.458123 | 10.324312 |
| Average | 0.000101 | 0.000227 | 0.0172886 | 0.1357144 | 1.4161362 | 10.6299084 |

We have also assessed the performance of a Broadcast when using a topology unaware tree, a topology aware hierarchical tree, similar to the one in FIG. 5, and the tree generated with the heuristic that sends first to the nearest neighbor, similar to the one in FIG. 7. We have run experiments on a supercomputer that has a dragonfly network topology. Our experimental results when running on 128 to 3072 nodes and 8 ranks per node show that the tree generated with the tree produced with the heuristic that sends first to the nearest neighbors can be up-to 1.15×faster than the broadcast using the tree generated with the hierarchical approach that sends first to the furthest away node (both algorithms are faster than a topology unaware algorithm). Given that applications usually have loops that execute for many iterations, the additional time that the nearest neighbor heuristic requires to generate the tree can be amortized across the many executions of the Broadcast collective itself. Simulations with these two heuristics also show that the heuristic that sends first to the nearest neighbors consistently results in faster broadcasts.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software running on a compute node, server, etc., or running on multiple compute nodes in a distributed manner, or on an IPU, DPU, or SmartNIC. Thus, embodiments of this invention may be used as or to support a software program, software modules, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on one or more a processing elements, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for building a broadcast tree for a broadcast operation in a network including nodes partitioned into a plurality of groups, each group including one or more switches, each switch coupled to a plurality of nodes, comprising:

obtaining a network topology for the network including a root node;

initializing a list of visited nodes (vnodes) and a list of unvisited nodes (unodes), a first vnode comprising the root node;

a) searching to find a unode that can be reached earliest from vnodes in the vnode list;

b) moving the unode that is found from the unode list to the vnode list; and c) adding new unodes to the unode list based on a location of the unode that is moved to the vnode list; and using selected group leader nodes and selected switch leader nodes during iterations of the search to find unodes that can be reached earliest from vnodes.

2. The method of claim 1, further comprising: repeating operations a), b), and c) until all nodes are in the list of visited nodes.

3. The method of claim 1, wherein the root node is coupled to a root switch and is in a root group, further comprising:

identifying group leader nodes for respective groups of nodes; and identifying switch leader nodes for sets of nodes coupled to respective switches.

4. The method of claim 1, further comprising:

for sets of multiple nodes having a same distance, marking one of the nodes; and for a given search iteration, only considering unodes that are marked when searching to find the unode that can be reached earliest from a vnode.

5. The method of claim 4, wherein an overall latency is determined as a sum of a predetermined latency to send a message plus a predetermined latency to receive the message plus a latency that is a function of a distance along a transmission path that is traversed between the vnode and the unode plus latencies added at one or more switches along the transmission path.

6. The method of claim 1, wherein searching to find a unode that can be reached earliest from a vnode comprises:

determining an overall latency for sending a message from the vnode to the unode; and when the vnode is not the root node, adding the overall latency that is determined to a time at which the vnode receives the message.

7. The method of claim 1, wherein adding new unodes to the unode list based on the location of the unode that is moved to the vnode list comprises:

when the unode is a switch leader node, adding nodes connected to the same switch as the unode other than the unode; and marking one of the nodes that is added to participate in at least one subsequent iteration of the search.

8. The method of claim 1, further comprising:

determining the list of visited nodes is empty;

when there are unvisited switch leader nodes from switches in the group of the unode that is found, adding switch leader nodes from other switches in the group of the unode; and marking one of the switch leader nodes to participate on the search.

9. The method of claim 1, wherein the broadcast tree that is generated employs a nearest neighbor heuristic.

10. The method of claim 1, wherein the broadcast tree that is built is optimized such that it is configured to obtain a minimal overall time to broadcast a message to all the nodes in the network other than the root node.

11. The method of claim 1, further comprising:

maintaining min-heaps for vnodes;

maintaining min-heaps for unodes; and employing the min-heaps for the vnodes and unodes to select which vnodes and unodes to search on.

12. One or more non-transitory machine-readable storage mediums having instructions stored thereon configured to be executed on one or more processors to build a broadcast tree for a broadcast operation in a network including nodes partitioned into a plurality of groups, each group including one or more switches, each switch coupled to a plurality of nodes, wherein building the broadcast tree comprises:

retrieving or obtaining a network topology for the network including a root node;

initializing a list of visited nodes (vnodes) and a list of unvisited nodes (unodes), a first vnode comprising the root node;

a) searching to find a unode that can be reached earliest from vnodes in the vnode list;

b) moving the unode that is found from the unode list to the vnode list;

c) adding new unodes to the unode list based on a location of the unode that is moved to the vnode list;

for sets of multiple nodes having a same distance, marking one of the nodes; and for a given search iteration, only considering unodes that are marked when searching to find the unode that can be reached earliest from a vnode.

13. The non-transitory machine-readable storage medium of claim 12, wherein building the broadcast tree via execution of the instructions further comprises repeating operations a), b), and c) until all nodes are in the list of visited nodes.

14. The non-transitory machine-readable storage medium of claim 12, wherein searching to find a unode that can be reached earliest from a vnode comprises:

determining respective overall latencies for transmitting a message from the vnode to marked unodes in the unode list; and when the vnode is not the root node, adding the overall latency that is determined to a time at which the vnode receives the message.

15. The non-transitory machine-readable storage medium of claim 12, wherein adding new unodes to the unode list based on the location of the unode that is moved to the vnode list comprises:

when the unode is a switch leader node, adding nodes connected to the same switch as the unode other than the unode; and marking one of the nodes that is added to participate in at least one subsequent iteration of the search.

16. The non-transitory machine-readable storage medium of claim 12, wherein building the broadcast tree via execution of the instructions further comprises:

determining the list of visited nodes is empty;

when there are unvisited switch leader nodes from switches in the group of the unode that is found, adding switch leader nodes from other switches in the group of the unode; and marking one of the switch leader nodes to participate on the search.

17. The non-transitory machine-readable storage medium of claim 12, wherein the broadcast tree is optimized such that it is configured to obtain a minimal overall time to broadcast a message to all the nodes in the network other than the root node.

18. A system having a plurality of nodes interconnected via a plurality of switches in a network having a hierarchical topology including a group level, a switch level, and node level, wherein the nodes are used to perform distributed processing using broadcast messages, and wherein the system is configured to:

build a broadcast tree that is optimized such that it is configured to obtain a minimal overall time to broadcast a message originating at a root node to all the nodes in the network other than the root node; and employ the broadcast tree for broadcasting messages to perform a distributed processing task, wherein the network has N nodes and S switches, and the broadcast tree is built using an algorithm have a complexity on the order of N*S*S.

19. The system of claim 18, wherein the network has a dragonfly topology.

20. The system of claim 18, wherein N is greater than 10,000.

21. The system of claim 18, wherein the broadcast tree is built by:

obtaining a network topology for the network including a root node;

initializing a list of visited nodes (vnodes) and a list of unvisited nodes (unodes), a first vnode comprising the root node;

a) searching to find a unode that can be reached earliest from vnodes in the vnode list;

b) moving the unode that is found from the unode list to the vnode list;

c) adding new unodes to the unode list based on a location of the unode that is moved to the vnode list; and repeating operations a), b), and c) until all nodes are in the list of visited nodes.

* * * * *